United States Patent

[11] 3,534,708

| [72] | Inventor | Eugene W. Cauffman<br>Claypool, Indiana |
|---|---|---|
| [21] | Appl. No. | 706,416 |
| [22] | Filed | Feb. 19, 1968 |
| [45] | Patented | Oct. 20, 1970 |
| [73] | Assignee | Supreme Augers, Inc.<br>Silver Lake, Indiana |

[54] ANIMAL FEEDER
8 Claims, 6 Drawing Figs.

[52] U.S. Cl. .................................................. 119/51.11,
                                                              119/51.5
[51] Int. Cl. .................................................. A01k 05/00
[50] Field of Search ........................................ 119/51.11,
                                                       51.5, 56; 222/276

[56] References Cited
UNITED STATES PATENTS

| 1,109,009 | 9/1914 | O'Brien .................. | 119/56 |
| 2,642,837 | 6/1953 | Schroeder ............... | 119/52 |
| 3,029,790 | 4/1962 | Loudon ................... | 119/51.11 |
| 3,196,835 | 7/1965 | Bergevin .................. | 119/51.5X |
| 3,233,590 | 2/1966 | Venca ..................... | 119/51.5 |

Primary Examiner—Hugh R. Chamblee
Attorney—Eugene C. Knoblock

ABSTRACT: An animal feeder including a feeding trough and an overlying feed storage container. The bottom of said feed storage container has a plurality of longitudinally spaced apertures. An elongated actuator is longitudinally positioned within said feed storage container and includes a plurality of transverse pusher members slidably engaging the upper surface of the bottom of said storage container. Each pusher member is positioned between adjacent apertures and is shiftable therebetween upon reciprocation of said elongated actuator so as to cause feed from the storage container to fall through the apertures into the feeding trough. A feed deflector overlies each aperture and is spaced from the elongated actuator. A conduit for the supply of liquid is connected to the feeding trough. Means responsive to the level of the liquid and feed mixture or mash in the feeding trough controls the supply of liquid through the conduit and the reciprocation of the elongated actuator so that the liquid and feed mixture in the feeding trough can be replenished as required.

Patented Oct. 20, 1970
3,534,708
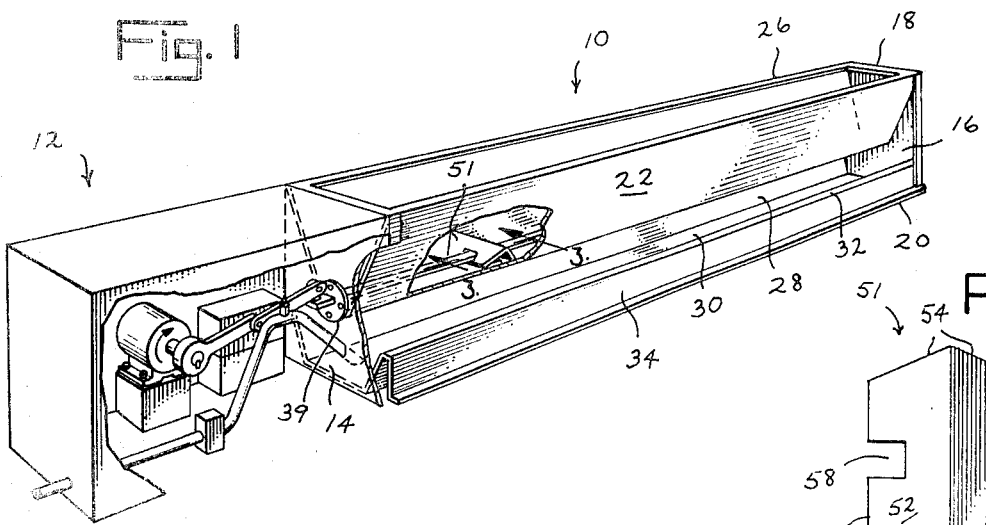
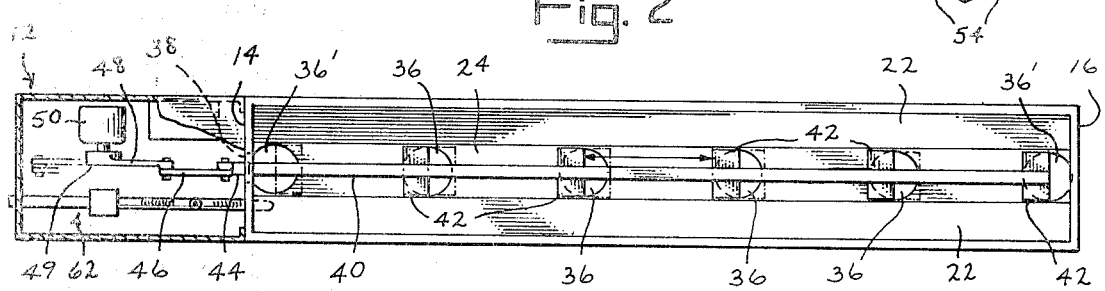
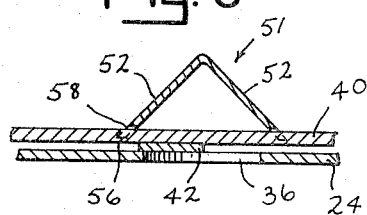
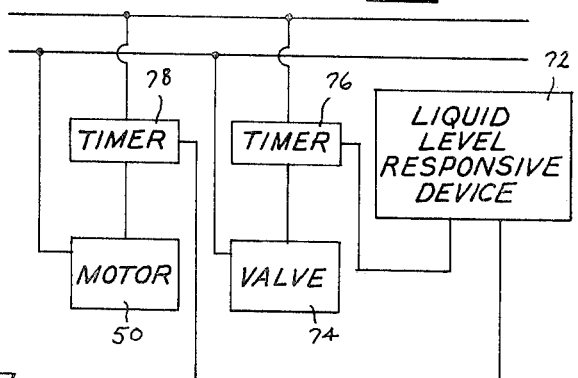
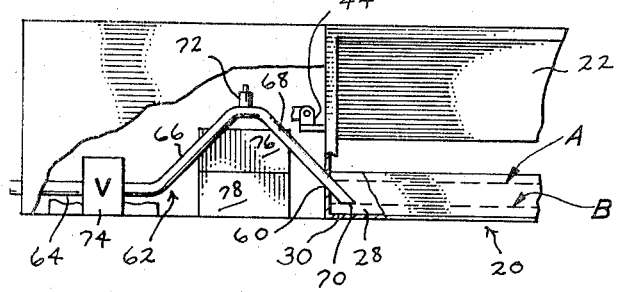
INVENTOR.
EUGENE W. CAUFFMAN
BY
ATTORNEY

3,534,708

ANIMAL FEEDER

BACKGROUND OF THE INVENTION

This invention relates to an automatic animal feeder.

Animal feeders generally use one of two means for causing feed material in an upper storage container to be distributed along a lower feeding trough. One of said means requires the manual adjustment of a discharge aperture or a plurality of apertures in a storage container, as shown in U.S. Pat. Nos. 1,901,089 and 2,766,725, through which apertures the feed falls into the feeding trough. The adjustment or regulation of this means of feed distribution is time-consuming, and it is also subject to the disadvantage that chunks of grain and foreign matter can cause jamming of parts of the feed supply means, thereby necessitating the freeing of the device by the operator. Also, such jamming can preclude the complete closing of the apertures. The second means of feed distribution involves the use of an auger longitudinally positioned adjacent the bottom of a storage container which advances feed material to spaced apertures in the container through which it falls into a feeding trough. A shortcoming of this means of feed distribution is the unevenness of distribution of feed in the feeding trough. In using an auger type feeder there is a tendency for the feed material to be propelled from one end of the storage container to the other, thus causing more feed to be discharged at one end of the feeding trough than the other. One method of reducing this undesirable characteristic of the auger type device is to provide compartments within the storage container which serve to limit the advance of feed by the auger to the length of each compartment. These corrective compartment means add to the cost of the feeder and do not entirely correct the tendency of the auger to unevenly distribute the feed material.

When it is desired to automatically introduce a liquid into a feeding trough for mixing with granular or other solid dry feed material deposited therein from a storage container, the animal feeders heretofore constructed commonly use a float controlled valve for opening and closing the liquid supply to the feeding trough. Upon repeated use these float valves have a tendency to misseat themselves or clog due to the collection and adherence of food and foreign matter about the valve seat and other parts of the float valve.

SUMMARY OF THE INVENTION

This invention pertains to an animal feeder having a feeding trough and a directly overlying feed storage container. The storage container includes a bottom having a plurality of apertures in selected longitudinally spaced relation therein. An elongated actuator is longitudinally positioned within the storage container and includes a plurality of spaced transverse pusher members each of which engages the bottom of the container and is adapted to ride upon the upper surface of the container bottom. Each pusher member is positioned between two adjacent bottom apertures. A deflector overlies each aperture and is spaced above the elongated actuator. Drive means is provided to reciprocate the actuator and the pusher members, so that the pusher members travel between adjacent apertures, causing feed material in the storage container to be pushed ahead of them and under the deflectors to where the feed material falls through the apertures into the feeding trough.

The device may also include a conduit having an inclined outlet which projects into the feeding trough and terminates spaced above the bottom of the trough. A liquid level responsive device is carried by or disposed in the conduit and is operatively connected to an upstream control valve and to the actuator drive means. When the level of the feed and liquid mixture or mash in the feeding trough lowers to expose the orifice of the conduit outlet so that liquid can flow from the inclined outlet, the liquid level responsive device is activated and causes the opening of the conduit control valve and the activation of the actuator drive means. After the feed and liquid mixture has been replenished by operation of the actuator drive means and opening of the valve for a selected time, the conduit control valve is closed and the drive means is deactivated.

In the operation of the device the reciprocation of the pusher members between apertures and under the aperture deflectors minimizes the possibility that the feeder will clog or jam during distribution of feed material. Also, the positioning of a pusher member between two adjacent apertures permits selection of the number and spacing of the apertures in the trough as required to assure even distribution of feed material in the feeding trough.

While the device is primarily intended for use as an animal feeder it may be used for any other purpose requiring the periodic discharge of dry granular material from a container, with or without mixture thereof with liquid in selected proportions.

Accordingly, it is a purpose of this invention to provide an animal feeder of reliable and substantially maintenance free operation.

Another purpose of this invention is to provide a device of this character in which dry granular material is safely and substantially equally distributed from an upper storage container along a lower elongated receptacle.

Still another object of this invention is to provide an animal feeder which automatically replenishes the liquid and feed mixture in a feeding trough as it is consumed by feeding animals.

Further objects will become apparent upon a reading of the following description.

BRIEF DESCRIPTION OF THE DRAWINGS

A preferred embodiment of this invention has been chosen for the purposes of illustration and description wherein:

FIG. 1 is a perspective view of the feeder of this invention showing portions thereof cutaway exposing the internal feeder mechanisms.

FIG. 2 is a plan view of the feeder of this invention shown for illustration purposes without deflectors over the feed storage container apertures, and with a portion cutaway.

FIG. 3 is a fragmentary sectional view of a deflector overlying a feed storage container aperture with a feed pusher member therebetween taken along line 3—3 of FIG. 1.

FIG. 4 is a plan view of a deflector.

FIG. 5 is a fragmentary longitudinal elevation of the feeder of this invention showing portions cutaway.

FIG. 6 is a block diagram of a control circuit for the feeder of this invention.

DESCRIPTION OF THE PREFERRED EMBODIMENT

The preferred embodiment of the invention herein illustrated and described is not intended to be exhaustive or to limit the invention to the precise form disclosed. It is chosen and described in order to best explain the principles of the invention and its application and practical use to thereby enable others skilled in the art to best utilize the invention.

The animal feeder embodying this invention as shown in FIG. 1 includes a feed section 10 and a drive and control section 12. Feed section 10 includes an upper storage container 18 and a lower receptacle or feeding trough 20, each defined in part by end walls 14 and 16. Container 18 includes downwardly inwardly inclined longitudinal side walls 22 connected along their lower edges to a substantially horizontal bottom member 24 and at their respective ends to walls 14 and 16. The upper margin of each side wall 22 may have a horizontal outturned flange 26, and a cover may span the container.

Directly below and spaced from storage container 18 is located a feeding trough 20. Trough 20 includes downwardly inwardly inclined longitudinal side walls 28 connected along their lower edges to a substantially horizontal bottom member 30 and along their respective end edges to walls 14 and 16. The upper margin of each side wall 28 may have an outturned flange 32 which terminates in a depending substantially vertical side wall 34. Preferably the trough 20 is liquid tight.

The bottom 24 of storage container 18 directly overlies feeding trough 20 and has formed therein a series of longitudinally spaced apertures 36. The apertures 36 are preferably equally spaced, are of substantially equal size, and preferably have a diameter substantially equal to the width of bottom member 24. Preferably the two outer most apertures 36' are adjacent respective end walls 14 and 16. The intermediate apertures 36 will vary as to number and spacing in accordance with the size of the feeder and the desired feed distribution within the feeding trough.

An aperture 38 is formed in end wall 14 at and above the level of the bottom 24 of the storage container 18. An elongated actuator rod 40 is positioned longitudinally within storage container 18 having one end portion 44 projecting through apertures 38 into the drive and control section 12 of the feeder. Aperture 38 is preferably closed by a flexible seal 39 carried by wall 14 and enclosing rod 40. A plurality of plates or pusher members 42 are fixedly attached to the bottom of the elongated actuator rod 40 and preferably extend fully across the width of the bottom 24 and are substantially equally spaced from one another a distance substantially equal to the spacing of apertures 36. The projecting end portion 44 of elongated actuator rod 40 is connected by a pivoted link 46 to a crank arm 48. Arm 48 is mounted by means of a hub 49 to the shaft of a constant speed motor 50 as shown in FIGS. 1 and 2 so that activation of motor 50 causes the reciprocation or shuttle movement of the elongated actuator rod 40 and attached pusher members 42 within storage container 18. The throw or stroke of longitudinal movement of actuator rod 40 is such that each pusher member 42 preferably reciprocates between centers of adjacent apertures 36, without crossing the lateral diameters of said apertures. The extent of travel of pusher members 42 is best illustrated in FIG. 2, wherein the pusher members 42 are shown in one limit position each adjacent an aperture in solid lines and in their opposite limit position each adjacent a different aperture in dotted lines. The width of each pusher member 42 is preferably at least equal to the radius of an aperture 36.

Overlying each aperture 36 is a deflector 51. Deflectors 51 are preferably tent-shaped or of inverted U-shape, having inclined side walls 52 extending across the container with their edges 54 secured to the storage container side walls 22. Each deflector side wall 52 preferably has a slot 58 formed therein at the midpoint of its lower edge 56. Each deflector 51 straddles actuator rod 40, which passes through slots 58, and is preferably spaced above bottom 24 so that pusher members 42 slightly clear the lower edges 56 of the deflector, as shown in FIG. 3, as they are advanced to a limit position partially spanning apertures 36.

End wall 14 has an aperture 60 formed in its lower part. A conduit 62 passes through aperture 60 into feeding trough 20. Conduit 62 includes an upstream section 64 and an inverted U-shaped outlet section 66. The lower part of outermost leg 68 of conduit outlet section 66 extends through aperture 60 in a sealed engagement and terminates spaced above bottom 30 of the feeding trough as shown in FIG. 5. It is preferable that the end or outlet of conduit section 66 be defined by a beveled edge 70 which lies in a plane adjacent and substantially parallel to the bottom 30 of the feeding trough and which is fixedly positioned at a predetermined distance below the upper rim of the trough. A liquid level responsive device 72 is operatively connected to conduit section 66 above its outlet and preferably at its uppermost portion. An electrically actuated valve 74 is operatively connected in the upstream section 64 of conduit 62. Upstream conduit section 64 may be connected to a liquid supply source (not shown) which preferably maintains a substantially constant pressure head within conduit 62 upstream from valve 74.

As shown in FIG. 6 the liquid level responsive device 72 may be operatively connected to control two independent electrical timers 76 and 78. One timer 76 serves to control the opening and closing of valve 74 and the other timer 78 serves to control the starting and stopping of motor 50. Liquid level responsive device 72 is preferably a device which can sense the absence of liquid within conduit section 66 adjacent thereto and functions to send out an electrical impulse to trigger the timers 76 and 78 which causes valve 74 to open and motor 50 to become activated. Such liquid level responsive devices are well known in the art and may be of the type illustrated in U.S. Pat. No. 2,618,248. The liquid level responsive device may include its own power source or receive its power from the same source as motor 50 and other components of the feeder. After a predetermined period of time has elapsed, the timer 76 causes valve 74 to close and timer 78 deactivates motor 50.

MODE OF OPERATION

For purposes of description it will be assumed that feeding trough 20 contains a mash or mixture of liquid, such as water, and granular feed material, said mixture having a level designated as line A in FIG. 5. With the liquid and feed mixture or mash at level A, valve 74 is in a closed position and motor 50 is not operating. As the liquid and feed mixture or mash is consumed by the feeding animals, its level in trough 20 recedes until a level designated by line B in FIG. 5 is reached. At this point the discharge end of conduit 62 is exposed to the the atmosphere, permitting liquid retained in conduit section 66 to drain into the trough. Liquid level responsive device 72 senses the absence of liquid in conduit section 66 adjacent thereto and sends an activating impulse to timers 76 and 78. Timers 76 and 78 in turn cause valve 74 to open and motor 50 to become activated. Liquid then flows through conduit 62 into the feed trough and actuator rod 40 and attached pusher members 42 are reciprocated within storage container 18, causing feed material positioned ahead of the pusher members to be pushed under deflectors 51 and discharged through apertures 36 into the feeding trough. After a predetermined period of time required for the mash or mixture of liquid and feed material to reach a selected level in the trough 20, the timers operate to stop motor 50 and to close the valve 74. As the liquid and feed mixture or mash rises, the discharge end of conduit 62 is again submerged in the mixture or mash, thus closing the conduit and causing conduit section 66 to remain substantially filled with liquid.

To facilitate the reciprocation action of actuator rod 40 and pusher members 42, the bottom surface of each pusher may be coated with an antifriction material, such as tetrofluoroethylene. Should the feeder be used in a climate where temperatures below freezing are expected, electrical heating coils or other heating means may be positioned adjacent to trough 20 and about conduit 62. The drive and control section 12 may be housed within a suitable enclosure. Timers 76 and 78 may be independently set to operate for different periods of time as required to control the ratio of supply of feed material to liquid to the trough 20. Alternatively, a single timer can be utilized to regulate both the valve 74 and motor 50 by selecting a rate of liquid flow through valve 74 which is correlated to the rate of discharge of feed material into the trough. In some embodiments of this invention it may be preferable to substitute a counter actuated by the strokes of the actuator rod 40 or revolutions of motor 50 for the control of the supply of liquid and of feed material.

It will be understood that the invention is not to be limited to the details herein given but may be modified within the scope of the appended claims.

I claim:

1. An animal feeder comprising a feeding trough, a feed storage container positioned spaced above said trough and including a bottom having a plurality of longitudinally spaced apertures therein, an elongated actuator longitudinally positioned within said storage container and including a plurality of transverse pusher members each normally positioned between adjacent apertures and shiftable along the bottom of said container from one adjacent aperture to the other adjacent aperture, a deflector overlying each aperture and said actuator, and drive means to reciprocate said actuator to shift each transverse pusher member between adjacent apertures and to cause feed in said storage container to be pushed by said transverse pusher member under said deflectors for discharge through said adjacent apertures and into the feeding trough.

2. The animal feeder of claim 1, wherein said feed storage container includes spaced ends, said storage container bottom has one said aperture adjacent each end and its remaining apertures substantially uniformly spaced therebetween, and said transverse pusher members are spaced apart substantially uniformly and similarly to the spacing of said apertures.

3. The animal feeder of claim 1, wherein said container includes an end having an aperture therein, said elongated actuator has an end portion extending through said end aperture, and said actuator drive means includes a crank means connected to said actuator end portion.

4. A device for discharging dry granular material to selected spaced points along the length of an elongated receptacle, comprising an elongated container having a bottom provided with a plurality of spaced apertures, a deflector positioned above each aperture and spaced from said bottom, an elongated reciprocable member traversing said bottom below said deflectors and including a plurality of pusher members each positioned between adjacent apertures and shiftable along the bottom of said container from one adjacent aperture to the other adjacent aperture, and means for reciprocating said elongated member to position each pusher member at an aperture at each end of its stroke of reciprocation.

5. A device for controlling the supply of dry granular material and liquid to a receptacle having a bottom, comprising power actuated means for supplying dry granular material to said receptacle, a liquid supply conduit having a generally horizontal part and a downwardly inclined part open at its lower end, said inclined part having a portion positioned in and spaced above the bottom of said receptacle, a valve controlling liquid flow in said conduit, a liquid sensing element connected with said generally horizontal part of said conduit and downstream from said valve whereby the sensing element is actuated upon the absence of liquid in said horizontal part and timer means responsive to actuation of said liquid sensing element for controlling said valve and granular material supply means.

6. An animal feeder comprising a feeding trough, a feed storage container positioned spaced above said trough and including a bottom having a plurality of longitudinally spaced apertures therein, an elongated actuator longitudinally positioned within said storage container and including a plurality of transverse pusher members shiftable along the bottom of said container, each transverse pusher member being normally positioned between adjacent apertures, a deflector overlying each aperture and said actuator, drive means to reciprocate said actuator to shift said transverse pusher members between adjacent apertures and thereby cause feed in said storage container to be pushed by said transverse pusher members under said deflectors for discharge through said apertures and into the feeding trough, and valved means supplying liquid to said feeding trough, and means responsive to the level of a feed and liquid mixture in said feeding trough for causing activation of said actuator drive means and opening of said liquid supply valve.

7. The animal feeder of claim 6, and timer means for controlling the duration of activation of said actuator drive means and liquid supply valve.

8. The animal feeder of claim 6, wherein said liquid supply means has a downwardly inclined end portion downstream of said liquid supply valve projecting into said feeding trough and terminating spaced above the bottom of said trough, said mixture level responsive means includes a liquid sensor operatively connected to an elevated part of said liquid supply end portion and responsive to the absence of liquid therein, said liquid supply valve and actuator drive means being operatively connected to said liquid sensor, so that when the level of the feed and liquid mixture in said feeding trough is lowered to expose the terminal end of said liquid supply end portion, liquid escapes from said liquid supply end portion and said liquid sensor causes opening of said liquid supply valve and activation of said actuator drive means.